(No Model.) 2 Sheets—Sheet 1.

B. F. HUGHES.
HAY LOADER.

No. 498,060. Patented May 23, 1893.

Witnesses:
L. C. Hills
D. E. Squires

Inventor:
Benjamin F. Hughes,
By Collamer & Co.,
Attorneys (No Model.) 2 Sheets—Sheet 2.

B. F. HUGHES.
HAY LOADER.

No. 498,060. Patented May 23, 1893.

Witnesses:
L. C. Hills.
D. E. Squires.

Inventor:
Benjamin F. Hughes,
By Collamer & Co.,
Attorneys.

UNITED STATES PATENT OFFICE.

BENJAMIN F. HUGHES, OF WAGGONER, ILLINOIS.

HAY-LOADER.

SPECIFICATION forming part of Letters Patent No. 498,060, dated May 23, 1893.

Application filed June 2, 1892. Serial No. 435,276. (No model.)

*To all whom it may concern:*

Be it known that I, BENJAMIN F. HUGHES, a citizen of the United States, residing at Waggoner, in the county of Montgomery and State of Illinois, have invented certain new and useful Improvements in Hay-Loaders; and I do hereby declare the following to be a full, clear, and exact description of the invention, such as will enable others skilled in the art to which it appertains to make and use the same.

This invention relates to hay loaders, and more especially to that type thereof employing endless belts; and the object of the same is to effect certain improvements in the specific construction of parts.

To this end the invention consists in a machine substantially as hereinafter more fully described and claimed and as illustrated in the accompanying drawings, wherein—

Figure 1:
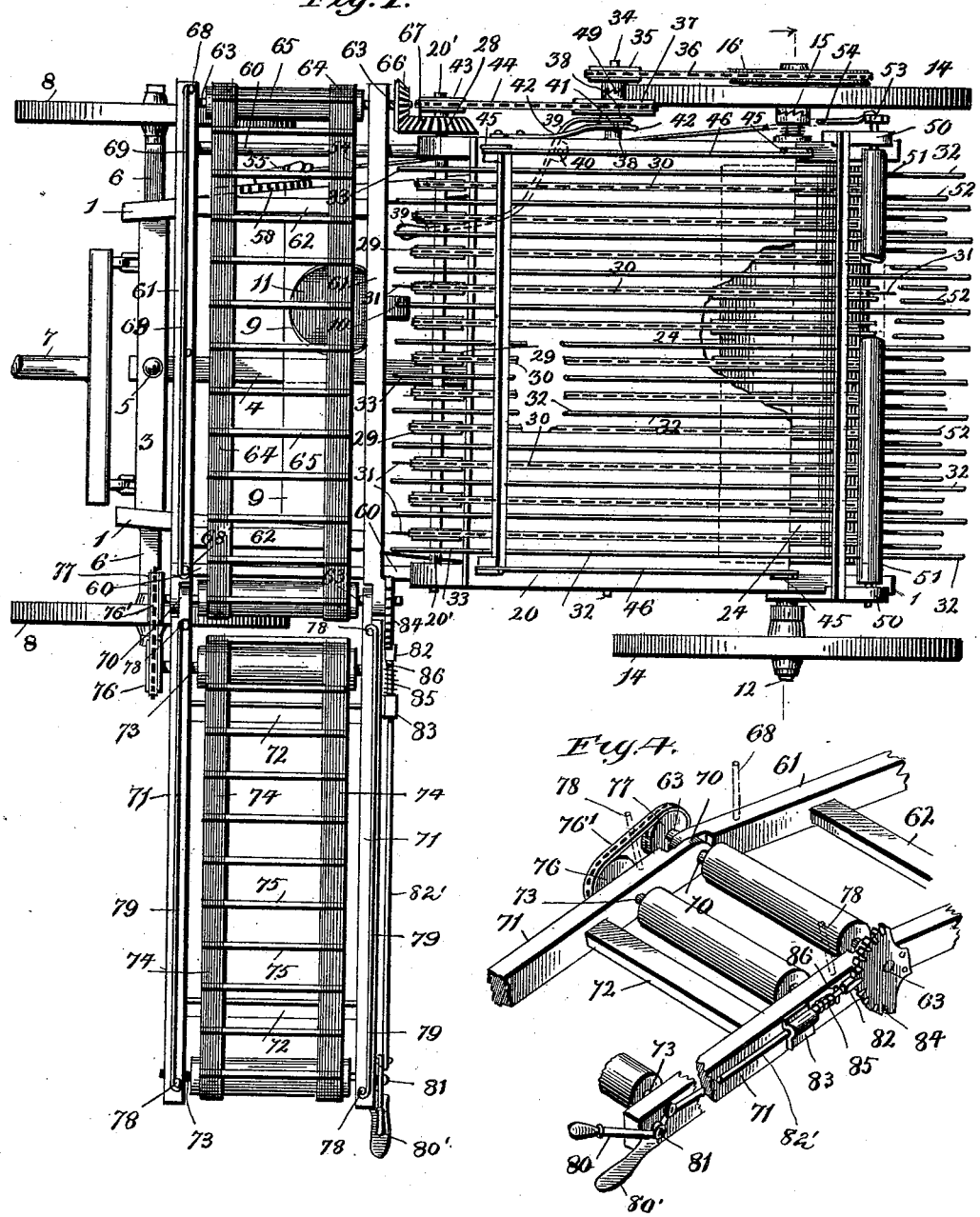
Figure 2:
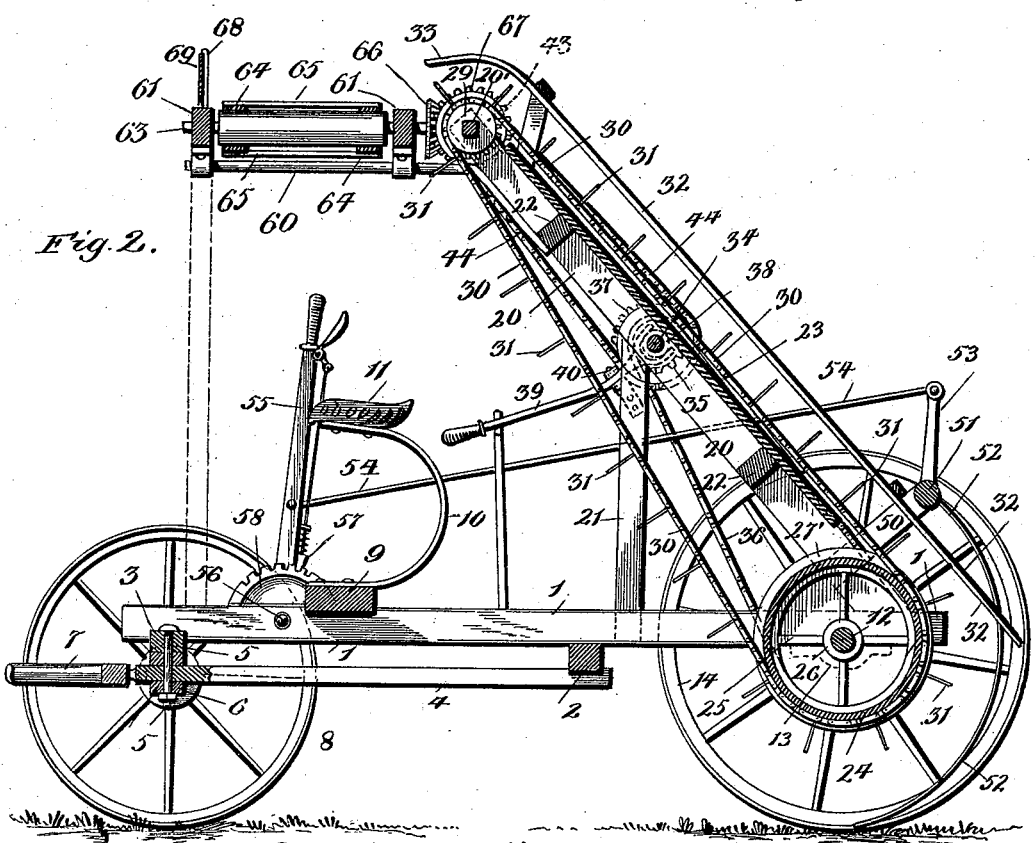
Figure 3:
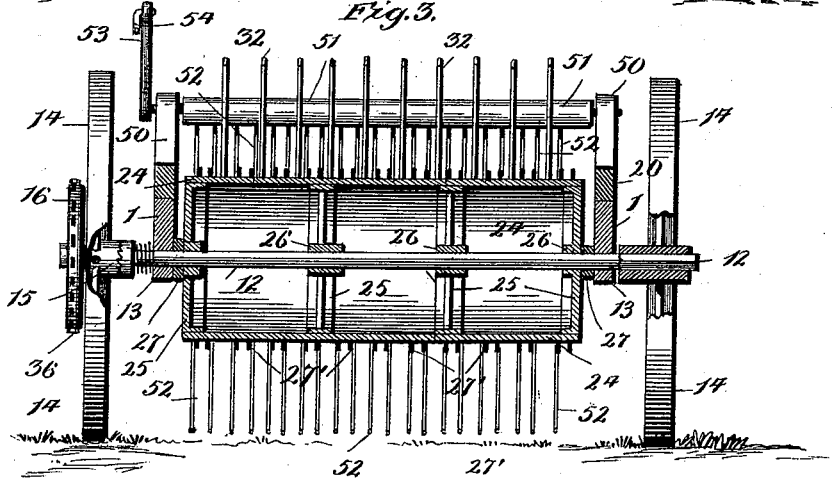

Figure 1 is a plan view of this improved machine, showing the supplemental carrier as raised nearly to a horizontal position. Fig. 2 is a central longitudinal section of the machine complete. Fig. 3 is a transverse section through the rear axle and looking from the front of the machine. Fig. 4 is a perspective detail showing the two belts which drive the elevator and the clutch mechanism on the idle shaft between said belts.

This invention comprises several principal parts, to wit: a framework mounted on supporting wheels, an elevator having a drum at its lower end journaled on the rear axle, a rake whose teeth curve around the drum, a main carrier located above the driver's seat and carrying the hay from the elevator to the left of the machine, and a supplemental carrier pivotally connected to the left end of the main carrier, and adapted to have its angle adjusted whereby the delivery therefrom may be regulated as desired. These several parts may be of any preferred construction which does not depart from the principle of my invention, and the exact sizes, shapes, and materials of these parts and the various members thereof is not essential, except perhaps that the carriers must be quite light as they are supported by the frame work of the elevator and to their weight is added that of the hay in the operation of the machine. Such operation will be clearly understood by those familiar with the art. As giving an insight into the construction described below, I may here state that as the machine is drawn over the ground, the rake takes up the hay and delivers it to the elevator, while the latter in turn carries it up and delivers it to the main carrier. This is above the driver's head and moves to the left (or right), to deliver the hay to the supplemental carrier, which can be adjusted by a second operator riding on a hay wagon which is driven alongside this machine, so that the supplemental carrier will deliver the hay into any part of his wagon body or onto any part of the load therein.

I will now describe a machine embodying a construction which will carry out my idea.

*The framework.*—1 1 are side bars connected at about their centers by a transverse bar 2 and at their front ends by another bar 3, and 4 is a longitudinal bar secured to the transverse bar 2 and extending beneath the bar 3. 5 is the king bolt which passes through the bar 3, the bar 4, and the front axle 6; whereby the strain of the draft is thus distributed between the bars 2 and 3. To said front axle is attached the pole or tongue 7 to which the horses are to be connected, the front wheels 8 being mounted on the ends of this axle as usual.

9 is a cross bar supported by the side bars about where shown, and 10 is a spring rising from this bar and supporting the driver's seat 11.

12 is the rear axle which is mounted in supports 13 under the rear ends of the side bars 1, and on each end of this axle is journaled one of the rear wheels 14, or, the axle may be journaled in the supports 13, and one wheel fast thereon while a ratchet box 15 of any ordinary construction connects the hub of the other wheel with the axle so as to permit the machine to round corners but to cause the turning of the axle by the wheels. One of the rear wheels (in this case the right one) has secured to the outer end of its hub a sprocket wheel 16.

*The elevator.*—20 are side bars rising from the rear ends of the side bars 1 and inclined forward, being supported by uprights 21 and connected by cross bars 22, and on the latter is secured a light flooring or table 23.

24 is a large drum having internal brackets 25 at its ends and at intervals throughout its length, which brackets have bearings 26 at their centers that are journaled on the rear axle between collars 27 secured thereon inside the side bars 1. The exterior of this drum is preferably provided with about eleven pairs of flanges 27' the members of each pair being slightly spaced. Journaled at 28 in the upper ends of the inclined side bars 20 is a shaft 20', whose body between the journals is square; and mounted on this square body are eleven sprocket wheels over which move chains 30, each passing between the members of a pair of said flanges on the drum, and completely around the table, and each chain having a number of outwardly projecting pins or fingers 31. These pins cannot strike the ground even when it is very uneven, because the drum is journaled directly on the axle and the latter will rise as the rear wheels pass over any obstruction.

32 designates straight guides rigidly supported in any suitable manner as shown, and standing above and parallel with the table, their lower ends passing over the drum and to points near the ground; and from their upper ends project curved tongues 33 which pass partially over the shaft 20' to which they are preferably concentric.

34 is an idle shaft journaled in the inclined side bars and carrying a sprocket wheel 35 connected by a chain belt 36 with the sprocket 16 on the rear supporting wheel. On this idle shaft is loosely mounted a sprocket wheel 37 whose hub 38 is grooved, and a lever 39 pivoted at 40 to one of the uprights, has a hook or ring 41 embracing said groove.

42 is a spring carried by the inclined side bar and bearing this sprocket wheel outwardly toward the fixed sprocket wheel 35, and ratchet toothed clutch members 49 are formed on the adjacent faces of these sprocket wheels or on their hubs, so that the forward movement of the supporting wheel carrying the driving sprocket will cause the upward movement of the elevator, but the rearward movement of said wheel will not move the elevator.

43 is a sprocket wheel mounted on the shaft 20', and 44 is a chain belt connecting this sprocket wheel with the sprocket 37 which is loosely mounted on the idle shaft. From the table at its edges and near its upper and lower ends, rise pins 45 which are connected by upright canvas strips 46 to prevent the hay falling laterally off the table.

*The rake.*—Journaled in supports 50 rising from the side bars 1 is a rake head 51, and 52 are rake teeth about twenty-one in number which are secured to this head and curved around to the rear of the drum, so as to cause their points to stand normally under the center of said drum, whereby they will not undesirably engage the earth. Between these teeth the lower ends of the guides 32 extend.

53 is an arm rising from the head 51 and connected by a rod 54 with a hand-lever 55 which is pivoted at 56 to one of the side bars 1, and preferably has a spring-actuated pawl 57 moving over a curved rack bar 58 adjacent the driver's seat.

*The main carrier.*—60 are arms projecting from the inclined side bars, (which arms may if desired be additionally supported at their forward ends, as seen in Fig. 2 in dotted lines) and 61 are parallel bars connected by cross bars 62 and constituting the frame of this carrier which stands across above the driver's seat and is supported by said arms. Through the ends of the bars 61 are journaled the shafts 63 of rollers, over which moves an endless apron preferably composed of side straps or belts 64 connected by transverse slats 65. The shaft of the right roller carries a beveled gear 66 which intermeshes with another beveled gear 67 that is secured to the upper elevator shaft 20'.

68 are pins rising from the front bar 61 and connected by a strip 69 of canvas.

*The supplemental carrier.*—71 are parallel bars connected by bars 72 and constituting the frame of the supplemental carrier, the inner ends of the bars 71 being pivotally mounted as at 70 on the shaft of the left roller of the main carrier. Through the ends of the bars 71 are journaled the shafts 73 of rollers over which moves an endless apron, preferably composed of side straps or belts 74 connected by transverse slats 75. The shaft of the inner roller carries a sprocket 76 which is connected entirely outside the frames by a chain belt 76' with a sprocket 77 mounted on the shaft of the left roller of the main carrier, whereby motion is communicated from the main to the supplemental carrier. 78 are pins rising from the side bars 71 and connected by a strip 79 of canvas.

80 is a bell crank lever pivoted at its angle as at 81 to the outer face of one of the side bars 71 of the supplemental carrier, with its body standing over a rigid finger 80' on said carrier frame; and connected by a rod 82' to the short arm of this lever is a pawl 82 which slides through a guiding eye 83 carried by the side bar, and has its tip arranged to engage a curved and toothed segment 84 which is rigidly supported by and on the outer face of the corresponding side bar 61 of the main carrier. A spring 85 is preferably coiled on the rod 82 between the eye 83 and a pin 86 through the pawl, whereby the latter is thrown normally into engagement with the segment.

The horses are hitched to the tongue and the driver takes his seat and drives the machine over a field whereon the grain or hay has been cut and allowed to dry. By means of the hand lever 55 he can adjust the rake so that its teeth will not catch in the ground or in the stubble but will take up the loose hay. The latter passes onto the tips of the teeth and strikes against the lower ends of the guides 32, up which it passes a slight distance until the fingers 31 in the elevator chains engage it. It is then carried up over the table 23 and under the guides 32 until it passes out beneath the tongues 33 and over the elevator shaft 20', when it is delivered onto the main carrier. The canvas strips 46 at the sides of the table prevent the hay from falling off the same, and the guides prevent the hay being blown away by whatever wind may exist. As the lower ends of the guides pass between the rake teeth, they take the strain from said teeth and cause the hay to rise to a position to be engaged by the fingers on the elevator. The apron of the main carrier moves the hay to the left (or right) and delivers it onto the supplemental carrier. A wagon is driven alongside this machine, and the operator on the wagon by grasping the finger 80' and the lever 80 can pinch them together to move the lever and disengage the pawl from the segment. Thereafter—without releasing his hold on the lever and finger—he can adjust the angle of the supplemental carrier as may be desired to cause the proper delivery of the hay into his wagon body or onto the load therein. The canvas strip along the front edge of the main carrier, and those along both edges of the supplemental carrier, are sufficiently high to prevent wind getting under the hay thereon and blowing it off the machine; and by locating the sprocket connection between the carriers and the adjusting devices for the supplemental carrier entirely outside the frames, these strips also prevent the hay interfering with such mechanisms. The driver of the machine by manipulating the lever 39 can throw the clutch members into or out of engagement to start or stop the movements of the elevator and the carriers, but of course when the elevator is not moving, the rake teeth will be usually raised above the ground.

What is claimed as new is—

1. In a hay loader, the combination with a framework supported on axles, wheels mounted independently on said axles, one of the rear wheels having a sprocket, a drum journaled loosely on the rear axle between the supports for the framework, and a rake; of a shaft supported by the framework, chains moving around said drum and shaft and forming an elevator, an idle shaft having two sprockets, one belted to the elevator shaft and the other to said sprocket on the rear wheel, a ratchet-toothed clutch between the two sprockets on the idle shaft for imparting only upward motion to said elevator, a spring holding the clutch members normally in engagement, and a hand-lever for separating said members, as and for the purpose set forth.

2. In a hay loader, the combination with a framework mounted on axles the forward one of which is pivoted, supporting wheels mounted independently on said axles, one of the rear wheels having a sprocket, side bars supported by the framework, a drum journaled loosely on said axle between the supports for the framework, and a rake substantially as described standing between the rear wheels with its teeth curving around and their points standing normally under the center of the drum; of a shaft journaled in said side bars and having a sprocket, chains moving around said drum and shaft and forming an elevator, an idle shaft journaled in one of the side bars and having two sprockets, one belted to that on the shaft and the other to that on the rear wheel, a ratchet toothed clutch between said two sprockets for imparting an upward motion only to the elevator, a spring holding clutch members normally engaged and a lever for separating said clutch members, as and for the purpose set forth.

3. In a hay loader, the combination with the framework supported on axles bearing wheels, a driver's seat on said framework, forwardly inclined side bars rising from the framework and supported by braces, and two rigid arms projecting forward from said side bars beyond the seat and above the sides of the framework; of a rake, an elevator supported by said side bars and driven from one of the rear wheels, a carrier frame rigidly supported by said arms above the seat, rollers in said frame, gearing between one of the rollers and the shaft of the elevator, a laterally moving apron around said rollers, a supplemental carrier frame pivoted on the shaft of the other roller, a carrier apron in this frame connected with and driven by said shaft, a toothed segment on the stationary frame, a spring-actuated pawl on the pivoted and supplemental frame, a bell-crank lever pivoted at its angle at the outer end of this frame, a rigid finger on the frame adjacent the longer arm of the lever, and a rod connecting the shorter arm of the lever with said pawl, all as and for the purpose set forth.

4. In a hay loader, the combination with a framework, a rake thereon, an inclined elevator, a laterally moving carrier to which said elevator delivers and by which elevator it is driven, and a supplemental carrier whose frame is pivoted on the shaft of one of the rollers of the lateral carrier; of a sprocket on the outer end of said shaft, another sprocket on the outer end of the adjacent shaft of the supplemental carrier, a belt connecting these sprockets, a toothed segment on the outer face and at the opposite side of the lateral frame, a spring-actuated pawl on the supplemental frame, means for operating this pawl from the outer end of the supplemental carrier, pins rising from the front bar of the lateral frame and from both bars of the supplemental frame, and upright strips connecting these pins and standing above said side bars, as and for the purpose set forth.

In testimony whereof I affix my signature in presence of two witnesses.

BENJAMIN F. HUGHES.

Witnesses:
M. B. CARPENTER,
E. B. SILLIN.